United States Patent [19]

Wilson

[11] 3,779,481

[45] Dec. 18, 1973

[54] VACUUM BUFFER

[75] Inventor: John H. Wilson, Tulsa, Okla.

[73] Assignee: Telex Computer Products, Inc., Tulsa, Okla.

[22] Filed: Dec. 27, 1971

[21] Appl. No.: 212,405

Related U.S. Application Data

[63] Continuation-in-part of Ser. No. 199,697, Nov. 17, 1971.

[52] U.S. Cl. .................................. 242/182, 226/97

[51] Int. Cl. ....................... G11b 15/58, G11b 23/12

[58] Field of Search ............ 179/100.2 P, 100.2 PM; 226/95, 97; 242/182–185

[56] References Cited

UNITED STATES PATENTS

| | | | |
|---|---|---|---|
| 3,254,854 | 6/1966 | Deighton et al. | 226/97 |
| 3,518,649 | 6/1970 | Gabor | 179/100.2 PM |
| 3,329,364 | 7/1967 | Brettell | 226/97 |

*Primary Examiner*—Leonard D. Christian

*Attorney*—Head & Johnson

[57] ABSTRACT

This invention describes an apparatus which uses a vacuum buffer to control the position of a magnetic tape against the transducing heads whereby the tape can be lifted away from the head surface during rewind. The vacuum buffer comprises an enclosed space on the front of the tape deck which is enclosed by two rotating cylindrical elements, the tape stretched across the top of the elements and a wall closing the space on the bottom side, between the two rotating elements. One or both of the rotating elements can be capstans. The oxide surface of the tape is placed uppermost and the head structure is mounted between and above the rollers with the transducing gaps below. Vacuum is applied through an opening in the back wall of the tape deck and a cover plate mounted to the wall closes off the buffer space on the front. Applying vacuum to the buffer space, the tape is pressed downward by atmospheric pressure, taking it out of contact with the transducing heads.

3 Claims, 3 Drawing Figures

VACUUM BUFFER

CROSS REFERENCE TO RELATED APPLICATION

This is a continuation-in-part of my copending application Ser. No. 199,697 entitled "Tape Drive" which was filed on Nov. 17, 1971.

BACKGROUND OF THE INVENTION

The invention is in the field of magnetic recording systems. More specifically, it concerns the design of the tape handling means on the tape deck.

Still more specifically, it concerns a structure in which the tape can be moved away from the transducing face of the heads by a vacuum control at any time that the tape is to be transported without being transduced.

In the prior art there are a large number of different configurations of apparatus on the tape deck of magnetic tape drive systems. These generally include the file reel of tape, the machine reel, vacuum columns for control of the tape in its movement across the recording heads, tape drive capstan means, etc. In most of these, the tension in the tape is utilized to provide a proper contacting of the oxide surface with the transducing gaps in the head structure.

However, there is no provision for changing this contacting situation even though during much of the tape handling, such as during the rewind operation and perhaps on a fast forward drive, the tape could very well be traversed out of contact with the heads.

It is therefore an important object of this invention to provide a simple means by which the oxide coated surface of the tape, which is normally in contact with the transducing gaps can be withdrawn from contact by the application of vacuum to a buffer space so that the tape can be traversed without contacting the head.

SUMMARY OF THE INVENTION

The weaknesses of the prior art devices and the objectives of this invention are met by an apparatus which is an improvement over the apparatus described in my copending application filed on Nov. 15, 1971, entitled "Tape Drive." In that application a novel system of tape control using two vacuum columns and two auxiliary vacuum columns were shown, in which the tape was carried with the plastic back surface in contact with all surfaces, rollers, etc., and the oxide coated surface was in contact only with the transducing gaps.

This invention is an improvement on my previous invention, in that it provides a means for withdrawing the oxide coated surface out of contact with the transducing gaps and the head structure at any time that traverse of the tape is required without the need for transducing information from or to the tape.

In this invention the tape is carried oxide face upward over two cylindrical elements which are of equal height and parallel to each other mounted with shafts parallel to each other and piercing the back plate of the tape deck. One of these cylinders or both can be capstans. There is a wall of substantially equal height to the length of the cylinders, which closes off a space between the cylinders on the bottom, between the two rollers. The tape, strung on the top of the rollers, contacts with its upper surface, the head system which is mounted above and between the rollers, with the transducing gaps on the under surface. When vacuum is applied to this space between the rollers, the tape and the wall, the tape is pushed downward by atmospheric pressure until it is out of contact with the heads. The control of the vacuum is by means of an elongated slot positioned vertically, centered between the rollers, and spaced downwardly from the heads so that when the tape is pulled down to the point where it crosses this vacuum opening, there is a balance created between the force set up by the magnitude of the vacuum in the buffer space, and the tension in the tape. The tape thereafter runs within a range of vertical movement completely out of contact with the heads.

BRIEF DESCRIPTION OF THE DRAWINGS

These and other objects of this invention and a better understanding of the principles and details of the invention will be evident from the following description taken in conjunction with the appended drawings, in which.

DESCRIPTION OF THE PREFERRED EMBODIMENT

Figure 1:
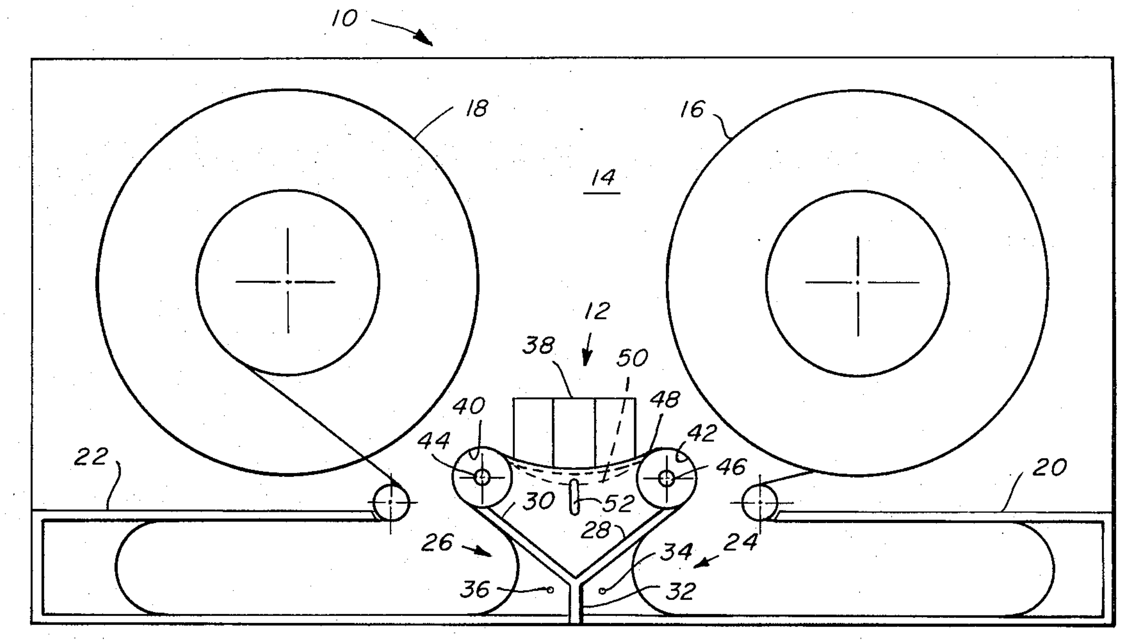
FIG. 1 is taken from my copending application entitled "Tape Drive" filed about Nov. 15, 1971, modified with the improvements of this invention.

Referring to the drawings, FIG. 1 represents in schematic form a front elevation view of the tape deck of this invention, including the vacuum buffer. This comprises a deck generally indicated by the numeral 10 and a buffer system generally indicated by the numeral 12.

The tape deck 10 has a back plate 14 and has mounted on it two reels 16 and 18 in the conventional manner. There are two vacuum columns 20 and 22 and two auxiliary vacuum columns 20 and 22 and two auxiliary vacuum columns 24 and 26. The tape from the file reel 16 passes through the vacuum columns 20 and 24, over a cylindrical element 42 which may be a capstan or a free-running roller, which turns about shaft 46. The tape then loops over a second cylindrical element 40 which rotates on shaft 44. This element is preferably a capstan, driven by motor means behind the back plate 14. The tape then loops into the vacuum columns 26 and 22 and then goes to the reel 18. The magnetic head system, indicated by numeral 38, is mounted on the back plate above and between the two cylindrical elements 42 and 40 with the transducing gaps in the bottom surface of the assembly 38. The tape is mounted with the oxide coating uppermost over the cylindrical elements 42 and 40 and under the head assembly 38 with the oxide coating in contact with the transducing gaps. There is a wall 30, 28 which closes off the space between and below the cylindrical elements 40 and 42. The head system, the rollers 40 and 42 and the wall are substantially of the same width and are covered by a plate 67 which can be a transparent plastic, for example. The plate 67 can be mounted to the wall 30, 28, by screws 68, for example.

Figures 2, 3:
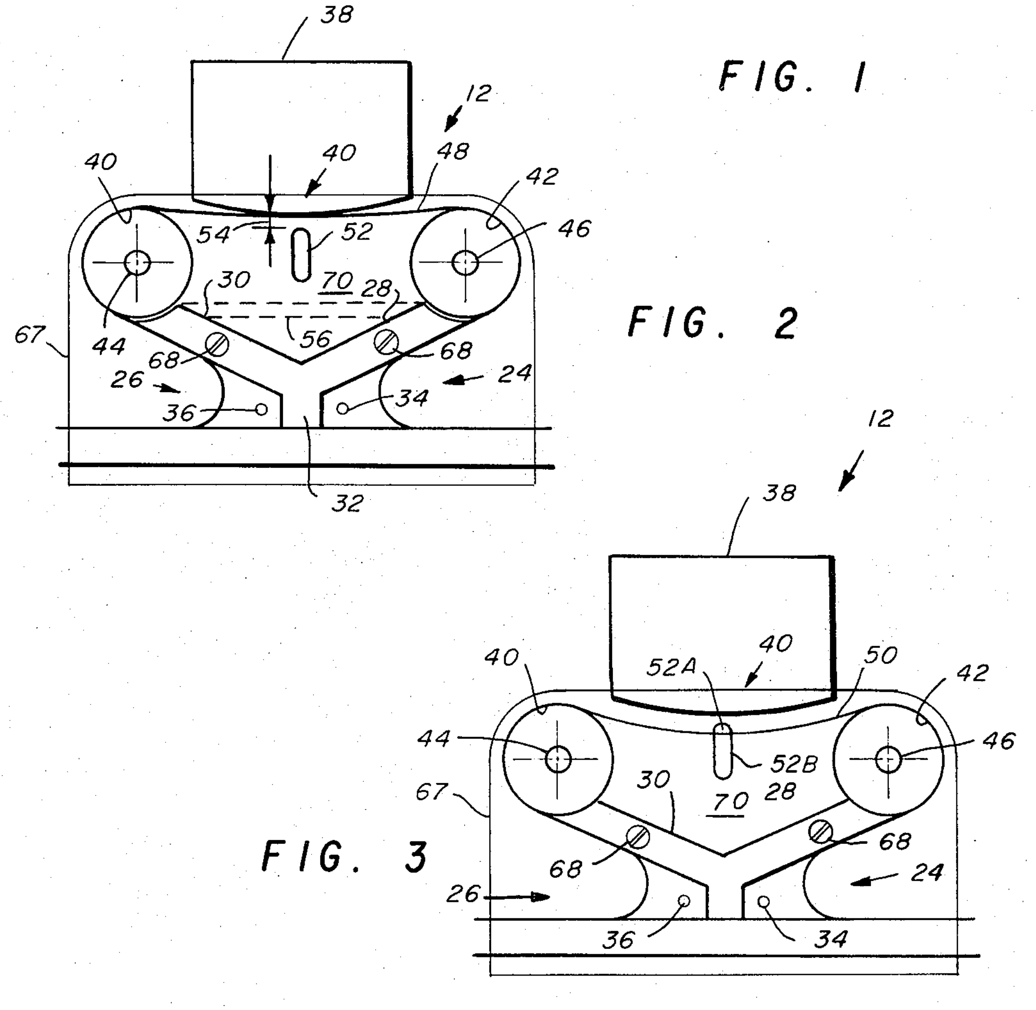
FIGS. 2 and 3 show respectively a more detailed view of the buffer space for the case where vacuum is not applied, and where vacuum is applied, and the tape is drawn out of contact with the heads.

Referring now to FIG. 2, which indicates the situation where the tape 48 is in transducing contact with the transducing gaps 40 of the head system 38. The tape can be driven by capstan roller 40 and runs over the free-running roller 42 into the auxiliary vacuum columns 26 and 24 as is fully explained in my copending application, the pertinent parts of which are incorporated into this application by reference, and need not be described further. The vacuum space, called a vacuum buffer, between the tape 48, rollers 40 and 42, walls 30 and 28, the back plate 14 and the cover plate 67 provides a sealed space.

An opening 52 through the back plate 14 connects to a vacuum control system. This opening 52 is preferably an elongated opening and is mounted centrally between the rollers and along the center line of the heads at a distance 54 below the bottom of the heads. When vacuum is applied, as in FIG. 3, the tape now in position 50 is pulled down into the vacuum buffer space because of unbalanced pressure of the atmosphere on the top of the tape, compared to the reduced pressure or vacuum pressure within the buffer space. However, as the tape moves downward below the top of the opening 52 it uncovers a portion 52A of the opening 52 above the tape and leaves a portion 52B below the tape. Atmospheric pressure above the tape can flow into the opening 52B. Therefore, once the top of the opening 52 starts to be uncovered, the vacuum or the pressure in the vacuum space 70 rises. As it rises, the differential pressure on the top of the tape decreases and so the opening 52A acts as a servo to control the position of the tape to a selected point below the top limit of the opening 52. Since the opening is mounted at a selected distance 54 below the heads this insures that the tape will be out of contact with the head. Thus, on rewind or forward drive, when the transducing action of the heads is not required, the wear on tape and head can be reduced by keeping the tape out of contact with the head.

This invention, therefore, provides for increased life for the oxide coating and for the recording head. The wall which encloses on the bottom the vacuum buffer space can be of any shape, such as a straight wall indicated by the dashed lines 56. However, it is convenient to provide it in the form of two straight portions 30 and 28 arranged in the form of the arms of a letter Y so that the two auxiliary vacuum columns 26 and 24 can be provided.

While the invention has been described with a certain degree of particularity it is manifest that many changes may be made in the details of construction and the arrangement of components. It is understood that the invention is not to be limited to the specific embodiments set forth herein by way of exemplifying the invention but the invention is to be limited only by the scope of the attached claim or claims, including the full range of equivalency to which each element or step thereof is entitled.

What is claimed:

1. In a magnetic tape handling system, including a tape deck, means to drive and control a file reel of tape and a machine reel, at least two vacuum columns and tape loop sensing means in said columns to control said reels, vacuum reservoir and vacuum control means, means to drive at least one capstan, and including head system means, the improvements in said tape deck comprising:

a. said at least two vacuum columns arranged along the bottom edge of said tape deck facing each other, with one edge of each forming a wall along the full length of the bottom edge of said tape deck, and their bottoms along opposite edges of said tape deck, the top walls of said vacuum columns extending from each edge part way toward the center of the tape deck the inner ends of said top walls terminated in first and second free-running rollers;

b. a Y-shaped wall centered along and above the bottom edge wall forming two short auxiliary vacuum columns in the two spaces between the bottom wall, the stem of the Y and the under surfaces of the two arms of the Y;

c. two rotatable cylindrical elements positioned at the ends of the two arms of the Y;

d. the head system means mounted to the tape deck within the arms of said Y with head gaps directed downwardly;

e. sheet means mounted to said Y-shaped wall and parallel to said back plate and extending over the area of the space bounded by said cylindrical elements, said tape, said head system and said wall; and f. perforation means through said back plate inside said area and controlled vacuum means applied to the back side of said perforation means;

whereby with the application of vacuum to said space, said tape will be pressed down by atmospheric pressure on the top surface thereof, and will be held out of contact with said head gaps.

2. The magnetic recording means as in claim 1 in which at least one of said two elements is a capstan means.

3. The magnetic recording means as in claim 1 in which said perforation means comprises an elongated opening placed with its long dimension vertical and centered under and spaced below said gap surface.

* * * * *